US007158154B2

(12) United States Patent
Kim et al.

(10) Patent No.: US 7,158,154 B2
(45) Date of Patent: Jan. 2, 2007

(54) METHOD FOR CONTROLLING DISPLAY MODE IN PORTABLE COMPUTER

(75) Inventors: Yang Hoon Kim, Sungnam-si (KR); Dong Hun Yoon, Gwangmyung-si (KR)

(73) Assignee: LG Electronics Inc., Seoul (KR)

( * ) Notice: Subject to any disclaimer, the term of this patent is extended or adjusted under 35 U.S.C. 154(b) by 213 days.

(21) Appl. No.: 10/812,904

(22) Filed: Mar. 31, 2004

(65) Prior Publication Data

US 2004/0257385 A1    Dec. 23, 2004

(30) Foreign Application Priority Data

Jun. 18, 2003  (KR) .................... 10-2003-0039282
Aug. 4, 2003   (KR) .................... 10-2003-0053805

(51) Int. Cl.
   *G09G 5/00*   (2006.01)
(52) U.S. Cl. .................... 345/649; 345/659; 713/1; 713/2
(58) Field of Classification Search .......... 345/650, 345/649, 659; 361/686
   See application file for complete search history.

(56) References Cited

U.S. PATENT DOCUMENTS 5,973,664 A * 10/1999 Badger .................... 345/659
6,326,978 B1 * 12/2001 Robbins ................... 345/654
6,903,927 B1 *  6/2005 Anlauff .................... 361/681
2003/0085870 A1 *  5/2003 Hinckley .................. 345/156
2003/0221876 A1 * 12/2003 Doczy et al. ............. 178/18.01
2003/0231189 A1 * 12/2003 Williams .................. 345/659
2004/0039862 A1 *  2/2004 Hunt et al. ................ 710/304

* cited by examiner

*Primary Examiner*—Mark Zimmerman
*Assistant Examiner*—David Chu
(74) *Attorney, Agent, or Firm*—Fleshner & Kim, LLP

(57) ABSTRACT

Disclosed are embodiments of a method and an apparatus for controlling a display mode in a portable computer. When a display mode of a liquid crystal display (LCD) is changed such as in response to a user's request, information of the changed display mode is stored being associated with a system mode. When a system is rebooted or the system mode is changed in a state in which the display mode information is stored, display mode information stored being associated with a current system mode is read, and the LCD display mode is set to an arbitrary display mode corresponding to the read display mode information. And, when a change of the LCD display mode is requested by the user, a wallpaper image for the requested display mode can be retrieved from among wallpaper images for display modes stored separately and displayed on the LCD.

31 Claims, 9 Drawing Sheets

Notebook Mode
(Default Mode = Landscape Mode)

*Tablet Mode*
(Default Mode = Portrait Mode)

Normal Mode

Background Picture     Logo

Rotational Mode

Logo & background picture are distorted

*Tablet Mode*
(User Set Mode = Landscape Mode)

METHOD FOR CONTROLLING DISPLAY MODE IN PORTABLE COMPUTER

BACKGROUND OF THE INVENTION

1. Field of the Invention

The present invention relates method and apparatus for controlling a display mode in a portable computer.

2. Background of the Related Art

Tablet computers have been developed on the basis of advantageous effects of desktop, notebook and handheld computers. A notebook computer is referred to as a mobile computer. But, when the notebook computer is used, its main body must be positioned on a fixed base surface. Meanwhile, a tablet computer can be easily used on a user's hand like a personal digital assistant (PDA). The tablet computer enables the user to directly take notes on a monitor using an electronic pen in place of a keyboard. Since an input unit in the tablet computer is based upon a touch screen, a special input unit such as a mouse is not necessary, and hence, the tablet computer can be conveniently used. Thus, the tablet computer has excellent mobility and convenience. Furthermore, since the tablet computer includes the computer's basic components inside the monitor, its exterior is simple. A portable computer can implement the notebook computer function and the tablet computer function in a single system in order for the user to conveniently and selectively use a notebook computer function and a tablet computer function.

A prior art portable computer automatically converts a display mode of its display to a landscape or portrait mode, which is a corresponding default display mode for a converted system mode when the system mode is converted from a notebook mode into a tablet mode or vice versa, or when a docking device is connected. For example, a display operation of the display is carried out in the landscape mode when the system mode is converted into the notebook mode as shown in FIG. 2, and the display operation of the display is carried out in the portrait mode when the system mode is converted into the tablet mode as shown in FIG. 3. When the docking device is connected to the prior art portable computer, the display operation of the display is carried out in the landscape or portrait mode set appropriately to an application program of the connected docking device. Thus, the default display mode predetermined to be the most appropriate for the system mode is automatically set.

Since the prior art portable computer automatically forces the display to carry out the display operation in only one display mode previously determined for a system mode or a docking device when the system mode is converted or the docking device is connected, the display mode of the display cannot be arbitrarily changed to the user-desired display mode. For example, the display operation of the display cannot be automatically carried out in the portrait mode when the system mode is converted into the notebook mode. Further, the display operation of the display cannot be automatically carried out in the landscape mode when the system mode is converted into the tablet mode. Consequently, the user cannot change the LCD display mode automatically to various display modes other than the previously determined display mode.

In addition, the prior art portable computer outputs a wallpaper image of a predetermined aspect ratio such as a landscape mode having an aspect ratio of '1024×768' to the display as shown in FIG. 4. The wallpaper image may consist of a logo of a portable computer manufacturer, a particular background picture, etc.

When a user requests, for example using a touch screen digitizer or a keyboard (not shown), a display mode of the display to be converted from the landscape mode into the portrait mode or a 90 degree rotational mode in which the display operation of the display is carried out in a direction rotated by 90 degrees, the display mode of the display is changed to the requested portrait mode or 90 degree rotational mode. However, the landscape wallpaper image having the aspect ratio of '1024×768' is converted into a resized portrait wallpaper image having an aspect ratio of '768× 1024' or '600×800' or a wallpaper image that is rotated by 90 degrees and resized to have an aspect ratio of '1024×768' by a video controller, and then, the converted wallpaper image is outputted to the display. Accordingly, there is a problem in that a logo, a background pattern, or/and a background picture included in the wallpaper image are all displayed in a distorted state as shown in FIG. 4.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a method and an apparatus for controlling a display mode in a portable computer that enables a display to carry out a display operation in a selected display mode variably set for a converted system mode.

Another object of the present invention is to provide a method and an apparatus for controlling a display mode in a portable computer that enables a display to carry out a display operation in a display mode set for a converted system mode by a user when a system is rebooted, a system mode is switched between a tablet mode and a notebook mode, or a docking device is connected.

Another object of the present invention to provide a method and an apparatus for controlling a display mode in a portable computer that enables a user to arbitrarily change the LCD display mode to various display modes.

Another object of the present invention to provide a method and an apparatus for controlling a display mode in a portable computer that can correctly display an image when the display mode is converted.

Another object of the present invention to provide a method and an apparatus for controlling a display mode in a portable computer that enables a logo, a background picture, etc. included in a wallpaper image to be displayed without being distorted when the display mode is converted.

In order to achieve at least the above objects in a whole or in part, in accordance with one aspect of the present invention there is provided a method for controlling a display mode in a portable computer that includes storing information of a changed display mode when the display mode of a display is changed in response to a user's request and setting the display mode to an arbitrary display mode corresponding to the stored changed display mode information when at least one of a system power supply of the portable computer is enabled and a system mode is changed.

To further achieve at least the above objects in a whole or in part, in accordance with one aspect of the present invention there is provided a method for controlling a display mode in a portable computer including a display that supports at least two system modes that includes storing information of a changed display mode when the display mode of a display is changed in association with a system mode and setting the display mode of the display to an arbitrary display mode corresponding to the stored display mode information associated with a current system mode when the portable computer is turned on.

To further achieve at least the above objects and advantages in a whole or in part, in accordance with one aspect of the present invention there is provided an article including a machine-readable storage medium containing instructions for controlling a display mode in a portable computer, the instructions, when executed, causing the portable computer to store information of a changed display mode corresponding to a system mode when the display mode of a display is changed, read the stored display mode information corresponding to a current system mode when a system is turned on or the system mode is changed when the display mode information is stored and set the display mode to correspond to the read display mode information.

To further achieve at least the above objects in a whole or in part, in accordance with one aspect of the present invention there is provided a method for controlling a display mode in a portable computer that includes when a change of the display mode of a display is requested by a user, retrieving a wallpaper image for the requested display mode among at least two wallpaper images previously stored each associated with different display modes and displaying the retrieved wallpaper image on the display.

To further achieve at least the above objects in a whole or in part, in accordance with one aspect of the present invention there is provided a portable computer having a configuration that is capable of switching a system mode between a notebook computer mode and a tablet computer mode that includes a display configured to support at least two display mode orientations, an input device configured to change a display mode orientation of the display according to a user's selection, a storage device configured to store the changed display mode orientation of the display corresponding to the system mode and a controller configured to set the display mode orientation of the display to correspond to the stored display mode orientation corresponding to a current system mode when the system mode is changed.

To further achieve at least the above objects in a whole or in part, in accordance with one aspect of the present invention there is provided an apparatus for controlling a display mode in a portable computer including a liquid crystal display (LCD) for supporting at least two display modes that includes first storing unit for storing display mode information of the LCD changed by a user, wherein the display mode information is stored associated with a system mode and control unit for setting the LCD display mode to an arbitrary display mode corresponding to display mode information stored in association with a current system mode when a system is booted or a system mode is changed in a state in which the display mode information is stored.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
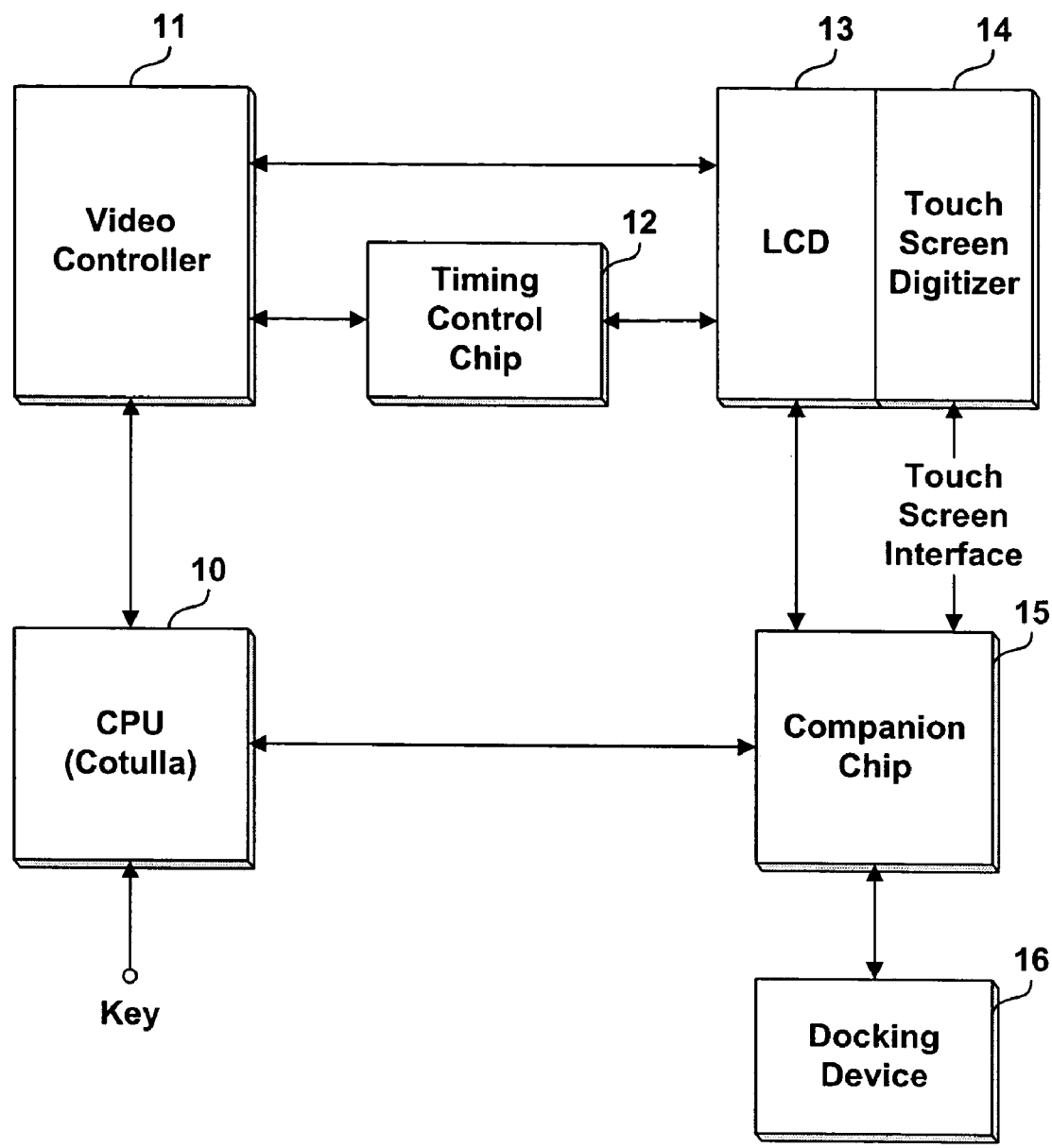
FIG. 1 is a block diagram illustrating the configuration of a related art portable computer.
Figure 2:
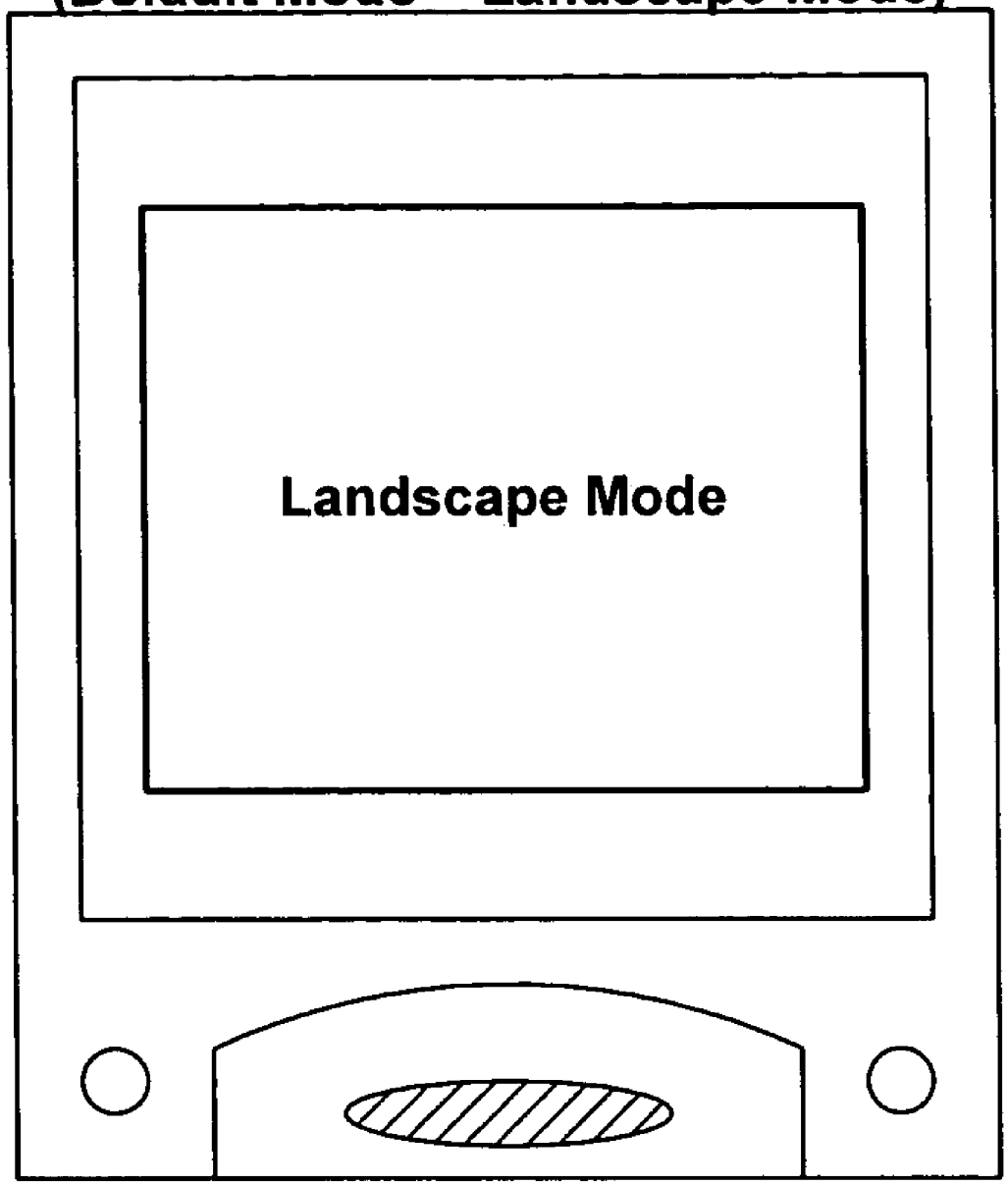
FIG. 2 is a diagram illustrating an operating state in which a display mode is set to a landscape mode being a default display mode for a notebook mode in a prior art portable computer.
Figure 3:
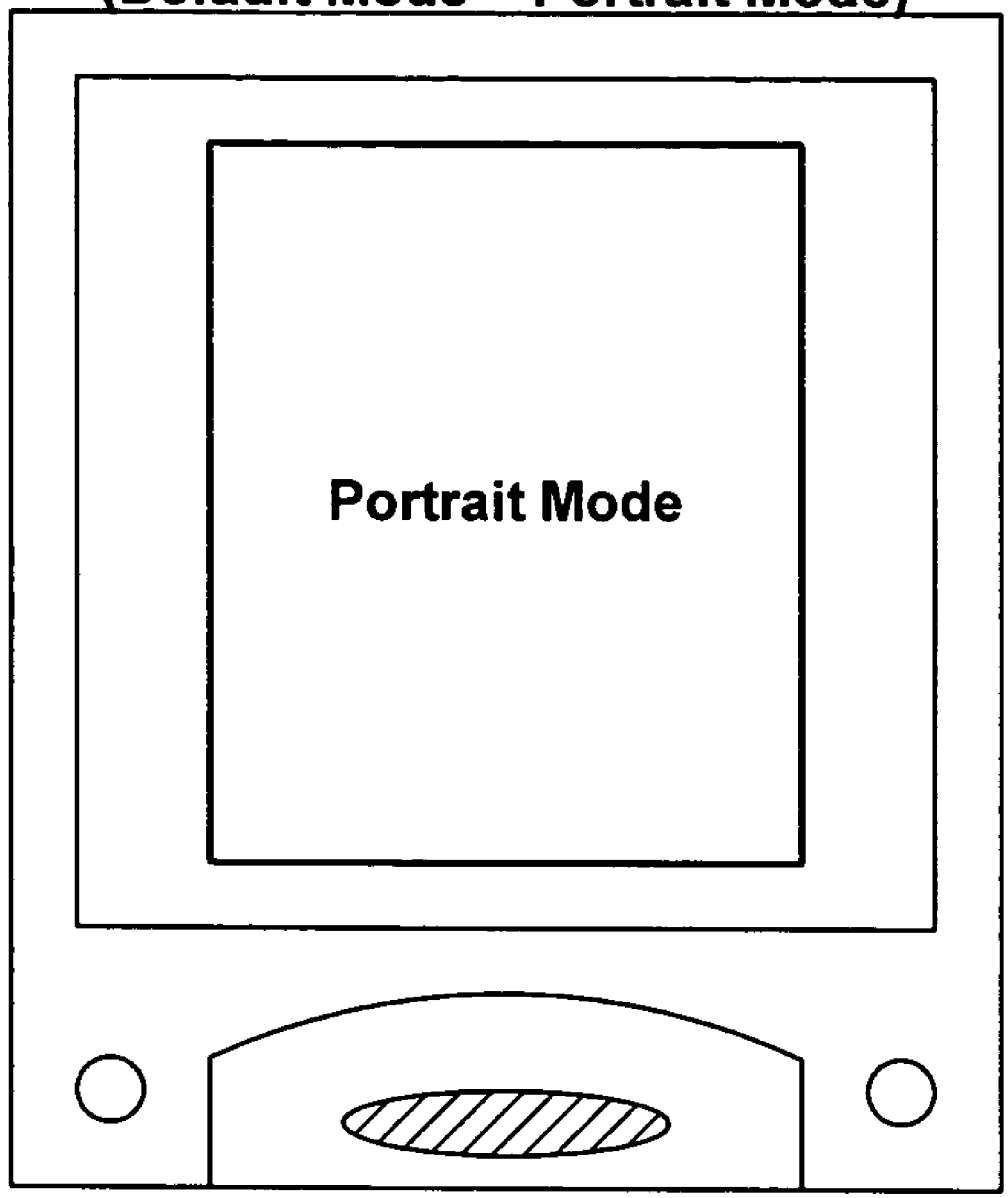
FIG. 3 is a diagram illustrating an operating state in which a display mode is set to a portrait mode being a default display mode for a tablet mode in a prior art portable computer.
Figure 4:
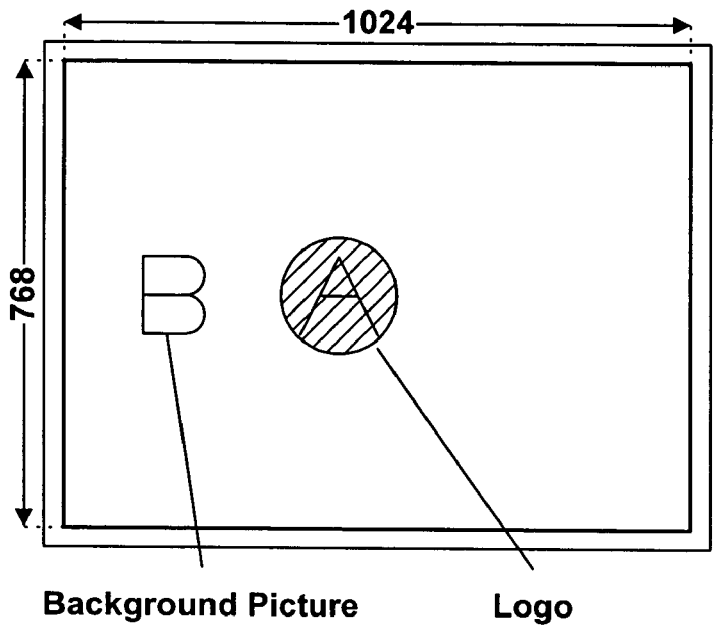
FIG. 4 is a diagram illustrating an operating state in which a wallpaper image for a rotational display mode is distorted in a prior art portable computer.
Figure 4:
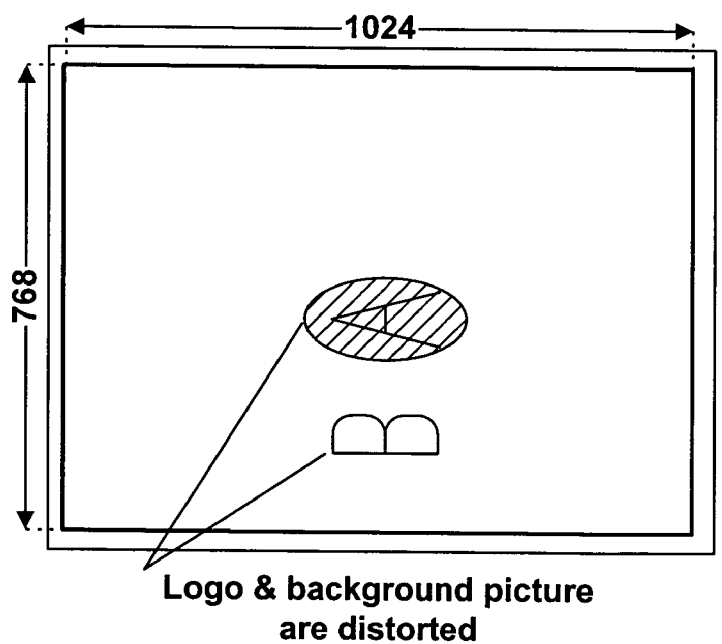

FIG. 1 is a block diagram illustrating the configuration of a related art portable computer. For example, the related art portable computer can include a central processing unit (CPU) 10, a video controller 11, a timing control chip 12, a liquid crystal display (LCD) 13, a touch screen 14, a companion chip 15, etc. The related art portable computer can be coupled to a docking device 16 equipped with various application programs.

The touch screen digitizer 14 can be formed on the entire surface of the LCD 13. The touch screen digitizer 14 or the like can allow a user to select and input a desired key using an input device such as an electronic pen or the user's finger as in a tablet computer, etc.

A display mode may be changed when a user optionally changes the display mode, a system mode is changed, a docking device is connected, etc. In the second and third cases, the display mode can be directly or automatically changed by one or more operating systems. Further, a display mode of an LCD include a landscape mode, a portrait mode, a rotational mode, etc.

Figure 5:
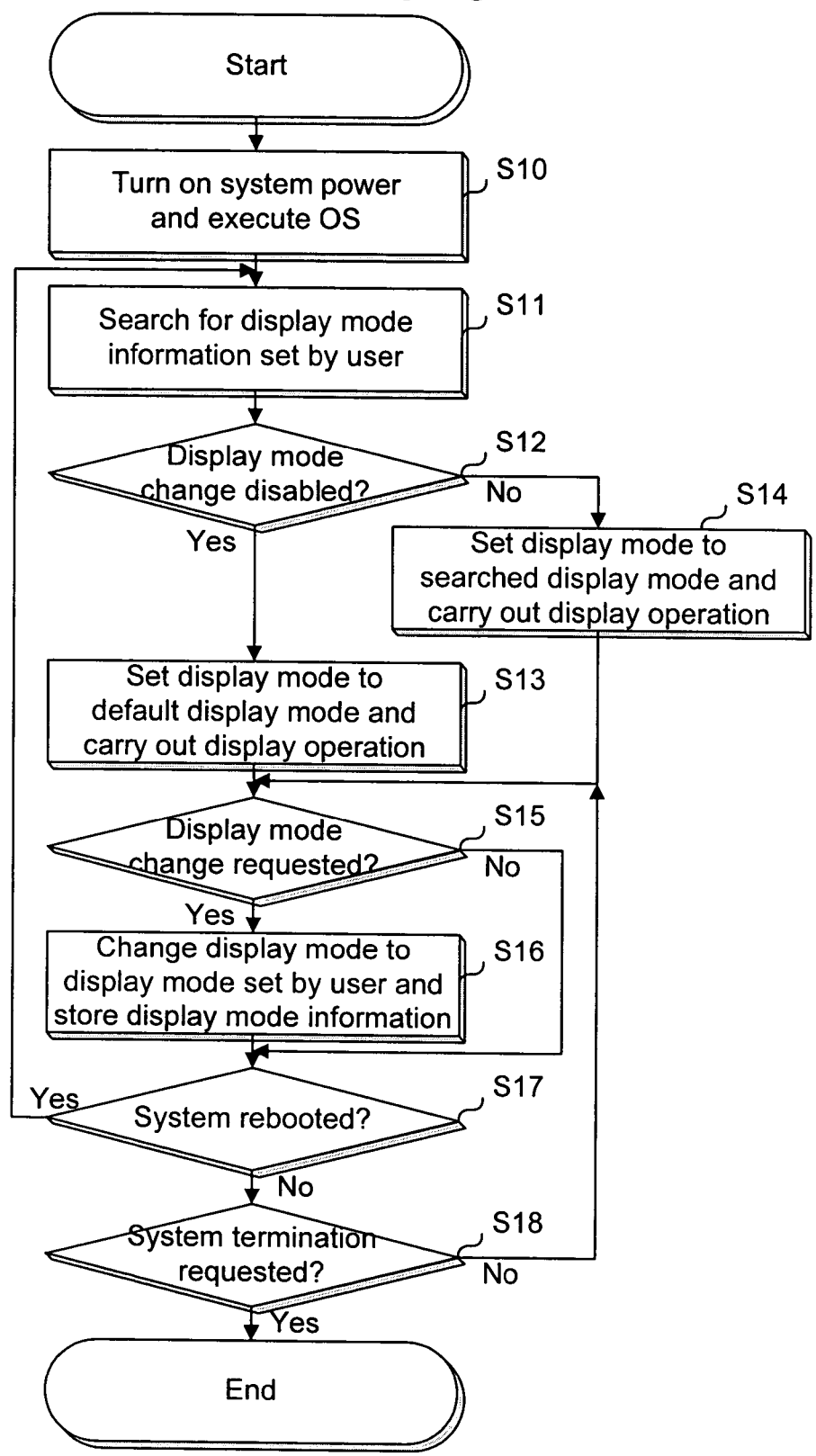
FIG. 5 is a flow chart illustrating a method for controlling a display mode in a portable computer in accordance with one preferred embodiment of the present invention.

FIG. 5 is a flow chart illustrating a method for controlling the display mode in the portable computer in accordance with an embodiment of the present invention. As shown in FIG. 5, the method for controlling a display mode in a portable computer will be described using and can be applied to various portable computer systems such as a notebook computer, a tablet computer, etc. that can be configured by the components shown in FIG. 1. However, the present invention is not intended to be so limited.

An operating system (OS) corresponding to a system mode selected by a user, for example, an OS for a notebook mode or an OS for a tablet mode can be directly or automatically booted in the portable computer when system power is turned on or enabled (block S10). In order to set the display mode of a liquid crystal display (LCD), the booted OS can search for display mode information previously set for the currently booted system mode, for example by a user (block S11). The display mode information previously set by the user can be LCD display mode information set for the sake of the user preference, task convenience or the like. The display mode information previously set can be stored in a storage medium such as an electrically erasable and programmable read only memory (EEPROM), hard disc or the like. Where the user does not set the display mode information previously, the OS can search for information of a default display mode for the currently booted system mode stored in the storage medium provided in the portable computer.

Then, the OS can determine whether or not the system can start while the LCD display mode is set to an arbitrary display mode previously set by the user rather than the default display mode for the currently booted system mode (block S12). If the LCD display mode cannot be set to the arbitrary display mode previously set by the user, the OS preferably sets the display mode of the LCD 13 to the landscape mode, the portrait mode, or the rotational display mode predetermined for the currently booted system mode or a docking device 16 connected to the portable computer (e.g., the default display mode) so that the LCD 13 can carry out the display operation in the set display mode (block S13). On the other hand, if the LCD display mode can be set to the arbitrary display mode previously set by the user, the OS sets the LCD display mode to an arbitrary display mode corresponding to the searched display mode information so that the LCD 13 can carry out the display operation in the set display mode (block S14).

The user can make a display mode change request when using the portable computer (block S15). When the user makes a display mode change request while the portable computer is used (block S15), the LCD display mode can be set to an arbitrary display mode selected by the user, the LCD 13 can perform the display operation in the set display mode, and information of the display mode changed by the user can be stored (block S16).

Figure 6:
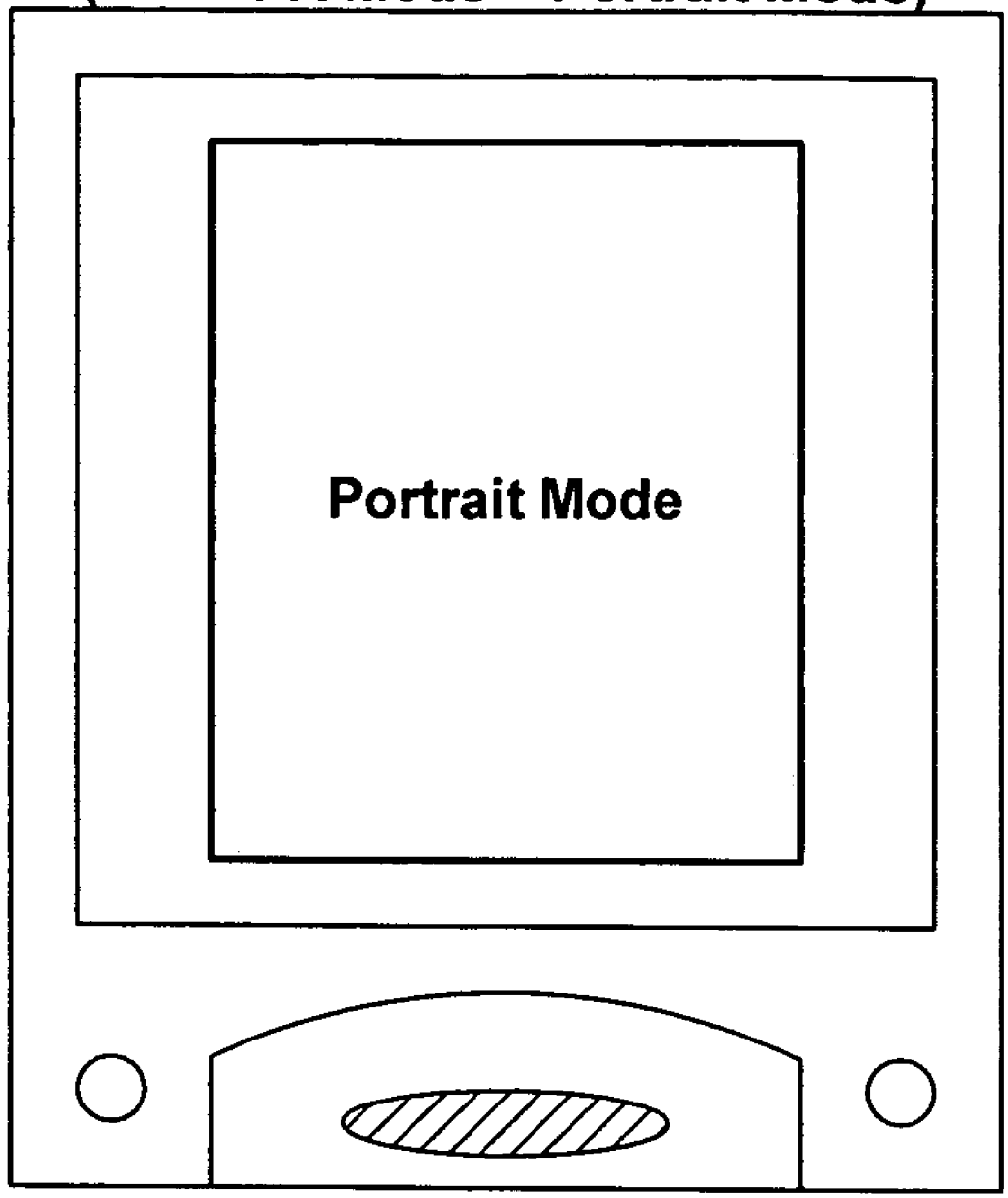
FIGS. 6 and 7 are diagrams illustrating exemplary operating states of display modes arbitrarily set by a user in accordance with the present invention.
Figure 7:
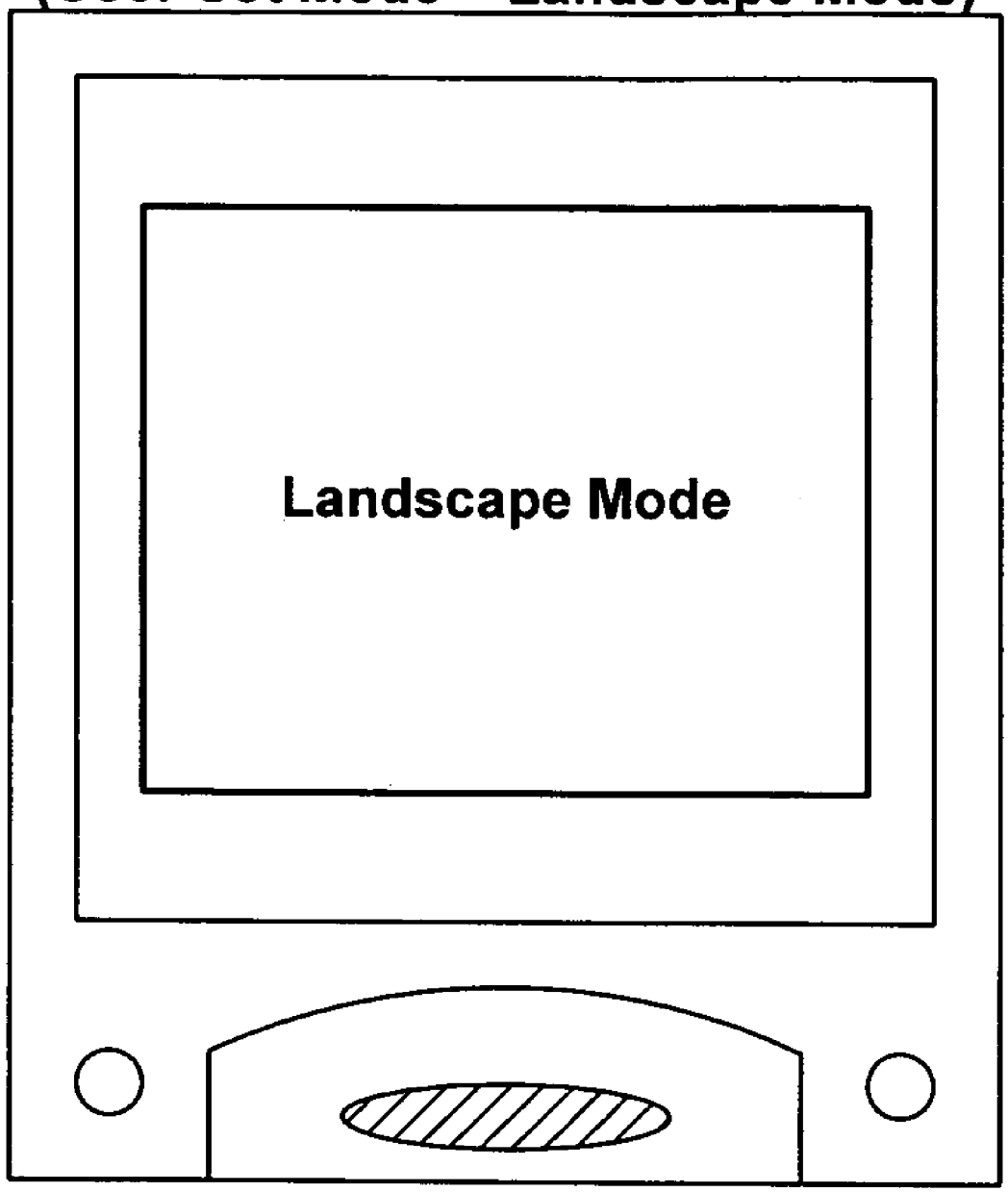

For example, where the user changes the display mode to the portrait mode when the LCD display mode is set to the landscape mode, which is the default display mode for the notebook mode of the current system mode, the display operation can be carried out in the portrait mode as shown in FIG. 6. In another example, where the user changes the display mode to the landscape mode in a state in which the LCD display mode is set to the portrait mode, which is the default display mode for the tablet mode of the current system mode, the display operation can be carried out in the landscape mode as shown in FIG. 7. Thus, upon a next transition to the tablet mode or system re-boot, the initial LCD display mode can be the landscape mode. Where the user arbitrarily changes the LCD display mode to the landscape or portrait mode through an input unit, the changed display mode information can be stored being associated with the current system mode in the EEPROM or hard disc.

Where the system is rebooted, where the system mode is converted from the notebook mode into the tablet mode or vice versa, or where the docking device is connected, in a state in which the display mode information is stored being associated with each system mode as described above (block S17), the OS can repeat the above blocks S11 to S14. The above-described operations can be continuously performed until the system is terminated (block S18).

Figure 8:
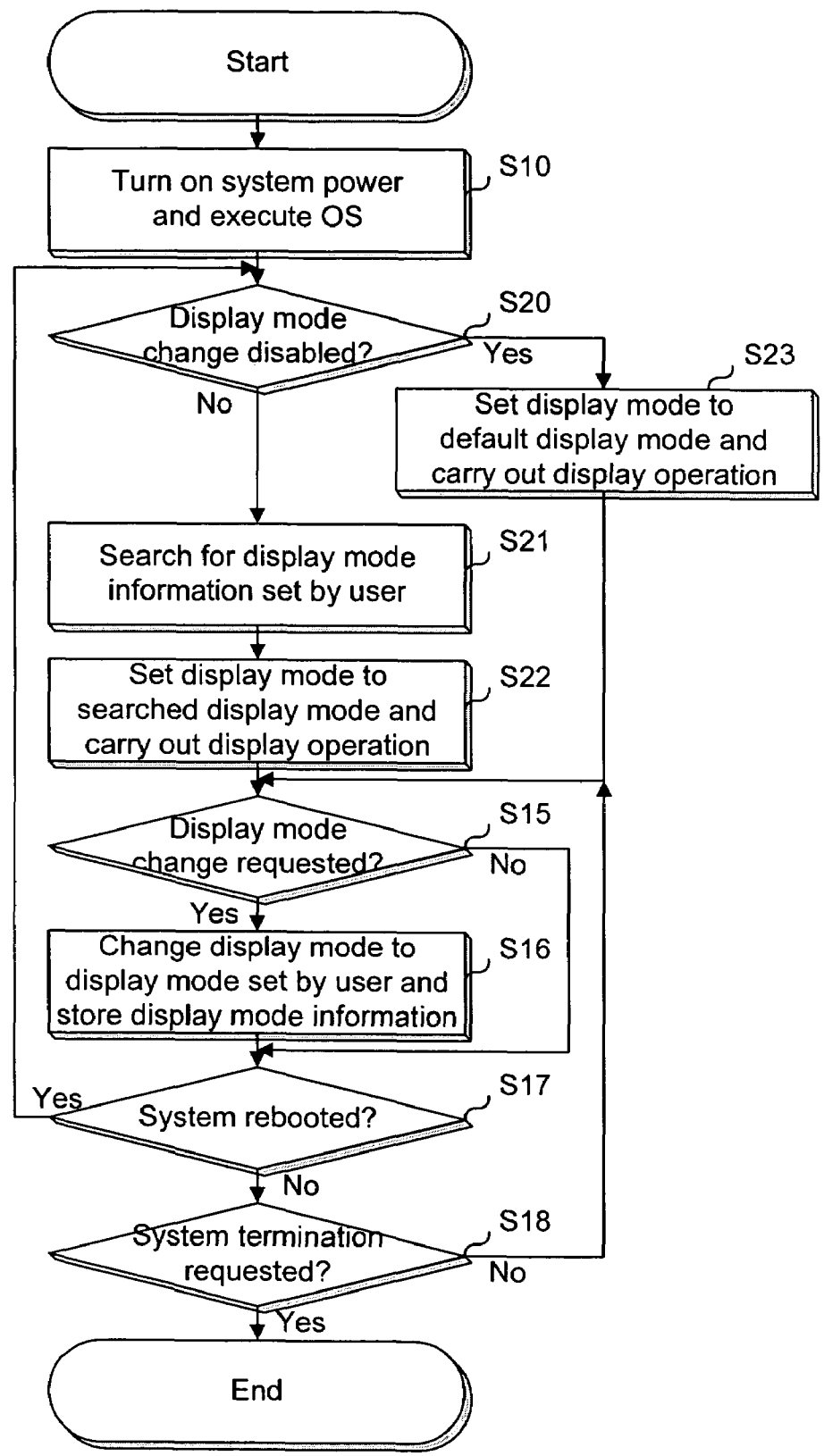
FIG. 8 is a flow chart illustrating a method for controlling a display mode in the portable computer in accordance with another preferred embodiment of the present invention.

FIG. 8 is a flow chart illustrating a method for controlling the display mode in the portable computer in accordance with another embodiment of the present invention. As shown in FIG. 8, the method for controlling a display mode in a portable computer will be described using and can be applied to various portable computer systems such as a notebook computer, a tablet computer, etc. that can be configured by the components shown in FIG. 1. However, the present invention is not intended to be so limited.

An operating system (OS) corresponding to a system mode selected by a user, for example, an OS for a notebook mode or an OS for a tablet mode can be directly or automatically booted in the portable computer when system power is turned on or enabled (block S10). The booted OS can determine whether or not the system can start while the LCD display mode is set to another display mode previously stored in storage medium (e.g., by a user) rather than a default display mode for the currently booted system mode (block S20). If the LCD display mode cannot be set to said another display mode previously stored in the storage medium for the currently booted system mode, the booted OS can set the LCD display mode to the default display mode for the currently booted system mode such that the LCD 13 can carry out the display operation in the set display mode (block S23). On the other hand, if the LCD display mode can be set to said another display mode previously stored for the currently booted system mode, the booted OS can search for information of the another display mode (e.g., by the user) stored in the storage medium (block S21) and set the LCD display mode to a display mode corresponding to the searched display mode information, such that the LCD 13 can carry out the display operation in the set display mode (block S22). As remaining processes in FIG. 8 were previously described, a description is omitted here.

As described above, block S12 shown in FIG. 5 and block S20 shown in FIG. 8 for allowing the OS to determine whether or not the system can start while the LCD display mode is set to another display mode previously stored in the storage medium (e.g., by a user) rather than the default display mode for the currently booted system mode are not necessarily required. In other words, embodiments according to the present invention can include only searching for the display mode information for the currently booted system mode from the storage medium; setting the LCD display mode to the searched display mode; and enabling the LCD to carry out the display operation in the set display mode. Thus, the block S12 and S13 shown in FIG. 5 as well as blocks S20 and S23 shown in FIG. 8 can be omitted.

Further in embodiments for controlling a display mode in the portable computer, a first display mode or the landscape mode can have an aspect ratio of '1024×768'. Another display mode can have an aspect ratio of '768×1024', '600×800', etc. other than the aspect ratio of the landscape mode. Said another display mode may be called a portrait mode. Also, there may be a rotational display mode. In the rotational display mode, an image displayed on the LCD 13 can be rotated, from a direction of the landscape mode, by 90 degrees, 180 degrees, or 270 degrees and resized to have the same aspect ratio of '1024×768' as that of the landscape mode.

The rotational display mode in which an image displayed on the LCD 13 is rotated by 90 degrees and resized to have the same aspect ratio of the landscape mode can be called a 90 degree rotational mode. In order for a logo, a background pattern, or/and a background picture included in a wallpaper image displayed on the LCD 13 not to be distorted after the display mode is converted from the landscape mode into another display mode such as the portrait mode or the rotational mode, an original ratio of a horizontal width to a vertical length of the logo, the background pattern, or/and the background picture included in the wallpaper image must be maintained. According to embodiments of the present invention, a respective wallpaper image, in which the original ratio of the horizontal width to the vertical length of the logo, the background pattern, or/and the background picture is maintained, can be separately stored in a converted state for each display mode.

Figure 9:
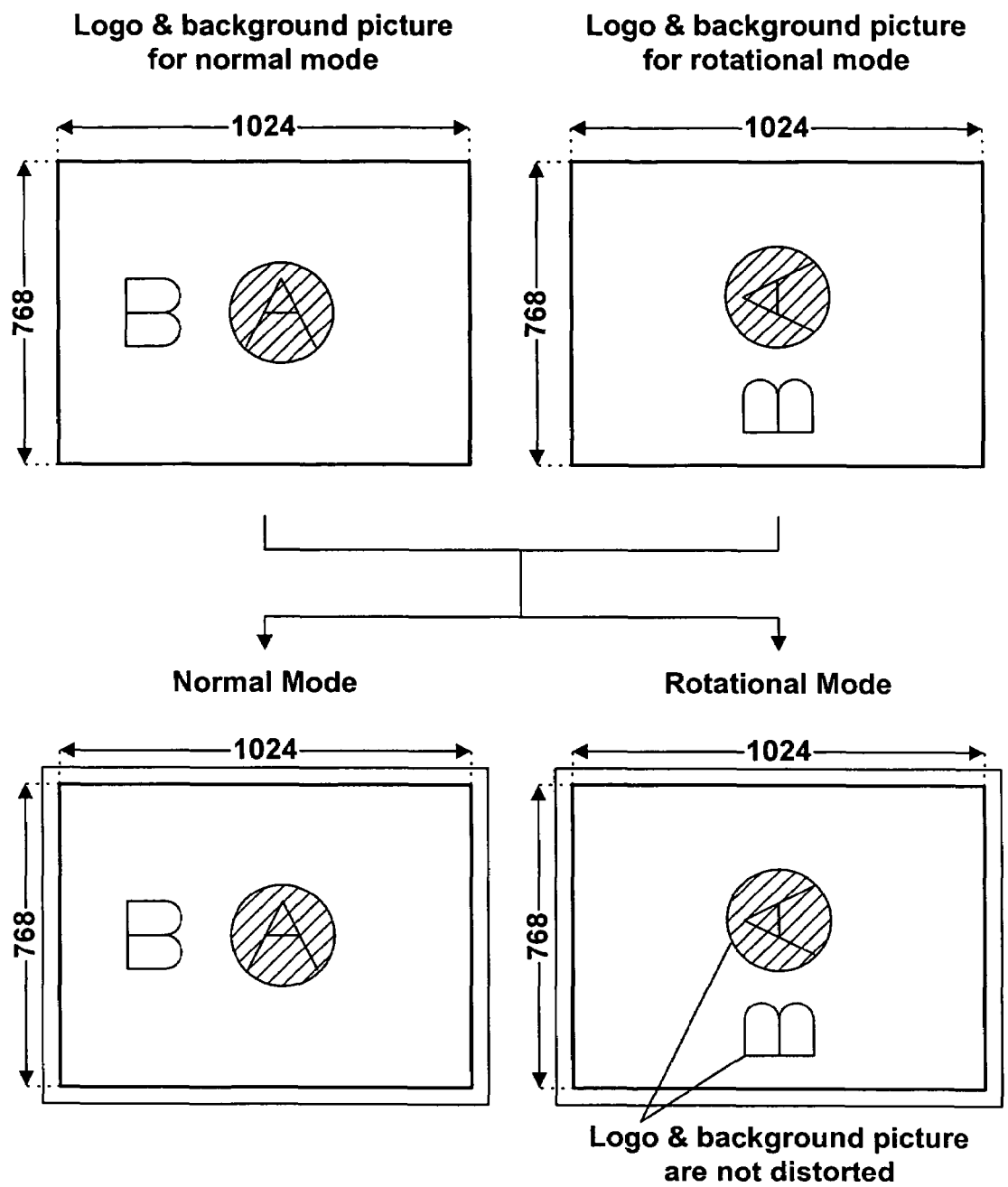
FIG. 9 is a diagram illustrating an operating state in which the wallpaper image for the rotational display mode is not distorted in the portable computer in accordance with preferred embodiments of the present invention.

When a user makes a request for a conversion of the display mode of the LCD 13, for example, a display mode conversion from the landscape mode into the portrait mode or the rotational mode, or vice versa, the video controller 11 preferably can retrieve a wallpaper image for the requested display mode among every wallpaper image for each display mode, and output the retrieved wallpaper image to the LCD 13. Accordingly, as shown in FIG. 9, the wallpaper image in which the logo, the background pattern, or/and the background picture is not distorted can be displayed, irrespective of the converted display mode.

As described above, embodiments according to the present invention were described using an LCD as a display. However, the present invention is not intended to be so limited.

Various software of firmware layers (formed of modules or routines, for example), including applications, operating system modules, device drivers, BIOS modules, and interrupt handlers, may be stored in one or more storage media in the portable computer system. The storage media includes the hard disk drive, CD or DVD drive, floppy drive, non-volatile memory, and system memory. The modules, routines, or other layers stored in the storage media contain instructions that when executed causes the system to perform programmed acts.

The software or firmware layers can be loaded into the system in one of many different ways. For example, code segments sorted on floppy disks, CD or DVD media, the hard disk, or transported through a network interface card, modem, or other interface mechanism may be loaded into the system and executed as corresponding software or firmware layers. In the loading or transport process, data signals that are embodied as carrier wave (transmitted over telephone lines, network liens, wireless links, cables, and the like) may communicate the code segments to the system.

Any reference in this specification to "one embodiments," "an embodiment" "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments according to the present invention have various advantages. Embodiments can enable a display (e.g., liquid crystal display) to carry out a display operation in an arbitrary display mode set for a changed system mode by a user when the system mode is changed between a tablet mode and a notebook mode or a docking device is connected, and can reduce or prevent a wallpaper image from being distorted irrespective of display modes. Embodiments according to the present invention can provide a method and an apparatus for controlling a display mode in a portable computer that can allow a user to arbitrarily change a display mode of a display appropriately to various task environments for an information search, document edition, etc., enable the display to carry out a display operation in a display mode previously set for a changed system mode by the user when a system is rebooted or a system mode is changed, which can increase the convenience and efficiency of the portable computer. Also, embodiments can provide a method for controlling a display mode in a portable computer that can enable a logo, a background picture, etc. included in a wallpaper image to be displayed properly without being distorted when the display mode of the LCD is changed.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for controlling a display mode in a portable computer, comprising:

storing information of a changed display mode when the display mode of a display is changed in response to a user's request; and setting the display mode to an arbitrary display mode corresponding to the stored changed display mode information when at least one of a system power supply of the portable computer is enabled or a system mode is changed, wherein the setting the display mode to an arbitrary display mode comprises, determining whether the display mode can be changed, wherein the display mode is variable in at least one system mode, and setting the display mode of the display to the arbitrary display mode corresponding to the stored changed display mode information when the display mode can be changed as a result of the determination, wherein the setting the display mode of the display comprises, setting the display mode according to a default display mode information of the system when the display mode cannot be changed as the result of the determination, and wherein the system mode includes one of notebook mode and tablet mode, wherein said each system mode is supported by a separate operating system.

2. The method of claim 1, wherein the stored changed display mode information includes display style and display orientation and is changed from a default display mode information for a corresponding system mode.

3. The method of claim 2, wherein the display style includes one of notebook mode and tablet mode and the display orientation includes one of landscape direction and portrait direction.

4. A method for controlling a display mode in a portable computer including a display that supports at least two system modes, comprising:

storing information of a changed display mode when the display mode of a display is changed from a default display mode information associated with a system mode or the default display mode information; and setting the display mode of the display to an arbitrary display mode corresponding to the stored display mode information associated with a current system mode when the portable computer is turned on, wherein each of said at least two system modes are supported by a separate operating system.

5. The method of claim 4, wherein the setting comprises:
determining whether the display mode can be changed when the portable computer is turned on when the changed display mode information is stored;
reading the stored display mode information when the display mode can be changed as the result of the determination; and
setting the display mode to the arbitrary display mode corresponding to the read display mode information.

6. The method of claim 4, wherein the setting comprises:
determining whether the display mode can be changed when the portable computer is turned on when the changed display mode information is stored, wherein the display mode is variable in at least one system mode; and
setting the display mode to a default display mode corresponding to default display mode information of the current system mode when the display mode cannot be changed as the result of the determination.

7. The method of claim 6, wherein the display is a liquid crystal display.

8. The method of claim 4, wherein the stored changed display mode information includes one of landscape direction and portrait direction, and wherein the system mode includes one of notebook mode and tablet mode, wherein an additional system mode is supported by one of said separate operating systems.

9. An article including a machine-readable storage medium containing instructions for controlling a display mode in a portable computer, the instructions, when executed, causing the portable computer to:
store information of a changed display mode corresponding to a system mode when the display mode of a display is changed from a default display mode information associated with each system mode;
read the stored display mode information corresponding to a current system mode when a system is turned on or the system mode is changed when the display mode information is stored; and
set the display mode to correspond to the read display mode information, wherein said each system mode is supported by a separate operating system.

10. The article of claim 9, wherein the storage medium contains instructions for causing the portable computer to:
determine whether the display mode was changed; and
set the display mode to correspond to the read display mode information when the display mode was changed as a result of the determination.

11. The article of claim 10, wherein the storage medium contains instructions for causing the portable computer to:
set the display mode to a display mode corresponding to default display mode information of the current system mode when the display mode cannot be changed as the result of the determination.

12. The article of claim 10, wherein the stored display mode information includes display orientation being one of landscape direction and portrait direction, and wherein the system mode includes one of notebook mode and tablet mode.

13. The article of claim 11, wherein the stored display mode information includes display orientation being one of landscape direction and portrait direction, and wherein the system mode includes one of notebook mode and tablet mode.

14. A method for controlling a display mode in a portable computer, comprising:
when a change of the display mode of a display is requested by a user, retrieving a wallpaper image for the requested display mode among at least two corresponding wallpaper images previously stored each associated with different display modes; and
displaying the retrieved wallpaper image on the display, wherein the display mode include notebook mode and tablet mode.

15. The method of claim 14, wherein the display modes include a reference mode and a plurality of rotational modes, wherein images displayed on the display in each of the plurality of rotational modes is respectively rotated from a direction of the reference mode by a natural number times a predetermined angle and resized to have the same aspect ratio of that of the reference mode, and wherein a ratio of a horizontal width to a vertical length of a logo, a background pattern or a background picture included in the wallpaper images for the plurality of rotational modes are same as an original ratio of the horizontal width to the vertical length of the logo, the background pattern or the background picture included in the wallpaper image for the reference mode.

16. The method of claim 15, wherein the predetermined angle is 90 degrees, and the plurality of rotational modes comprise at least one of a 90 degree rotational mode and a 270 degree rotational mode.

17. The method of claim 15, wherein the display modes further include other display modes in which images displayed on the display are respectively resized to have different aspect ratios of that of the reference mode, wherein the ratio of the horizontal width to the vertical length of the logo, the background pattern or the background picture included in the wallpaper images for said other display modes are same as the original ratio of the horizontal width to the vertical length of the logo, the background pattern or the background picture included in the wallpaper image for the reference mode.

18. The method of claim 14, wherein each of the wallpaper images for the display modes are separately stored, and wherein the display is a liquid crystal display.

19. The method of claim 14, wherein the change of display mode is from a notebook mode of a convertible portable computer, comprising:
storing information of a changed display mode when the display mode of the display is changed in association from a default display mode information associated with a system mode; and
setting the display mode of the display to an arbitrary display mode corresponding to the stored display mode information associated with a current system mode when the portable computer is turned on or the system mode is changed.

20. A portable computer having a configuration that is capable of switching a system mode between a notebook computer mode and a tablet computer mode, comprising:
a display configured to support at least two display mode orientations;
an input device configured to change a display mode orientation of the display according to a user's selection from a default display mode orientation for a corresponding system mode;
a storage device configured to store the changed display mode orientation of the display corresponding to the system mode; and
a controller configured to set the display mode orientation of the display to correspond to the stored display mode orientation corresponding to a current system mode when the system mode is changed, wherein the storage device is configured to store wallpaper images for each display mode orientation.

21. The portable computer of claim 20, wherein the controller is configured to set the display mode of the display to correspond to the stored display mode orientation corresponding to the current system mode when a system is turned on and the display mode orientation is stored.

22. The portable computer of claim 21, wherein the controller sets the display mode to a default display mode orientation when the display mode cannot be set to the stored display mode orientation changed by the user.

23. The portable computer of claim 21, wherein the display mode and the display mode orientation correspond to a background image in a desktop application of the portable computer.

24. The portable computer of claim 20, wherein the storage device stores information of the default display mode orientation of the display for each system mode when the user does not change the display mode orientation, wherein said each system mode is supported by a separate operating system.

25. The portable computer of claim 20, wherein the controller retrieves a wallpaper image for a set display mode orientation among the wallpaper images for each display mode orientation stored in the storage device and displays the retrieved wallpaper image.

26. The portable computer of claim 20, wherein the display mode orientation includes landscape, portrait, rotational 90°0 and rotational 270°.

27. An apparatus for controlling a display mode in a portable computer including a liquid crystal display (LCD) for supporting at least two display modes, comprising:

first storing means for storing display mode information of the LCD changed by a user, wherein the display mode information is stored associated with a system mode, and wherein the system mode includes one of notebook mode and tablet mode; and control means for setting the LCD display mode to an arbitrary display mode corresponding to display mode information stored in association with a current system mode when a system is booted or the system mode is changed in a state in which the display mode information is stored, and wherein the arbitrary display mode is different from a first display mode associated with a system mode, and wherein said each system mode is supported by a separate operating system.

28. The apparatus of claim 27, wherein the first storing means stores information of default display modes of the LCD for each system mode when the user does not change the LCD display mode.

29. The apparatus of claim 28, wherein the control means sets the LCD display mode to a default mode for the current system mode when the LCD display mode cannot be set to the display mode changed by the user when the system is booted or the system mode is changed.

30. The apparatus of claim 27, further comprising a second storing means for storing wallpaper images for each LCD display mode, wherein the control means retrieves a wallpaper image for a set display mode among the wallpaper images for each LCD display mode stored in the second storing means, and displays the retrieved wallpaper image.

31. The apparatus of claim 27, wherein the stored display mode information includes the system mode and display orientation, wherein the display orientation includes one of landscape direction, portrait direction and rotation direction.

* * * * *